(12) United States Patent
Mittal et al.

(10) Patent No.: US 10,409,743 B1
(45) Date of Patent: Sep. 10, 2019

(54) TRANSPARENT PORT AGGREGATION IN MULTI-CHIP TRANSPORT PROTOCOLS

(71) Applicant: Xilinx, Inc., San Jose, CA (US)

(72) Inventors: Millind Mittal, Saratoga, CA (US); Jaideep Dastidar, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/024,500

(22) Filed: Jun. 29, 2018

(51) Int. Cl.
*G06F 13/14* (2006.01)
*G06F 13/16* (2006.01)
*G06F 13/42* (2006.01)

(52) U.S. Cl.
CPC ...... *G06F 13/1684* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 6,608,813 B1* | 8/2003 | Chiussi | ............ | H04L 45/00 370/216 |
| 6,914,907 B1* | 7/2005 | Bhardwaj | ............ | H04L 12/1886 370/390 |
| 8,422,493 B2* | 4/2013 | Kono | ............ | H04L 12/4641 370/389 |
| 8,787,374 B2* | 7/2014 | Maeda | ............ | H04L 61/103 370/390 |
| 9,306,845 B2* | 4/2016 | Kumagai | ............ | H04L 45/74 |
| 9,391,835 B2* | 7/2016 | Aoshima | ............ | H04L 41/0654 |
| 9,525,591 B2* | 12/2016 | Yasuda | ............ | H04L 41/0654 |
| 9,794,194 B2* | 10/2017 | Yasuda | ............ | H04L 49/552 |
| 10,097,466 B2* | 10/2018 | Tang | ............ | H04L 12/10 |

\* cited by examiner

*Primary Examiner* — Cheng Yuan Tseng
(74) *Attorney, Agent, or Firm* — Carleton Clauss

(57) ABSTRACT

Various implementations of a multi-chip system operable according to a predefined transport protocol are disclosed. In one embodiment, a system comprises a first IC comprising a memory controller communicatively coupled with first physical ports. The system further comprises a second IC comprising second physical ports communicatively coupled with a first set of the first physical ports via first physical links, and one or more memory devices that are communicatively coupled with the second physical ports and accessible by the memory controller via the first physical links. The first IC further comprises an identification map table describing a first level of port aggregation to be applied across the first set. The second IC comprises a first distribution function configured to provide ordering to data communicated using the second physical ports. The first distribution function is based on the first level of port aggregation.

20 Claims, 8 Drawing Sheets

TRANSPARENT PORT AGGREGATION IN MULTI-CHIP TRANSPORT PROTOCOLS

TECHNICAL FIELD

The present disclosure generally relates to transport protocols in networked computing, and more specifically, to techniques for transparent port aggregation in multi-chip transport protocols.

BACKGROUND

Under many current transport protocols, such as Peripheral Component Interface Express (PCIe), a single device that is connected with multiple ports of a computing device is addressed as multiple devices. Thus, the number of distinct devices that are recognized by the computing device may be equivalent to the number of port connections. In such cases, the transport protocol is not intrinsically capable of coordinating a common function across multiple physical transports.

Certain functions, such as load/store memory accesses, require in-order semantics to perform correctly. However, under current transport protocols, load/store memory accesses across two or more physical transports may be out-of-order on one physical transport with respect to the other transport(s). One possible solution is to constrain load/store memory accesses to a single physical transport, even where multiple physical transports are available.

SUMMARY

Techniques for transparent port aggregation in a system employing a multi-chip transport protocol are described. One example is an integrated circuit (IC) operable according to a predefined transport protocol. The IC comprises a memory controller, and a plurality of first physical ports communicatively coupled with the memory controller. Data communicated according to the transport protocol is unordered relative to different first physical ports. The IC further comprises an identification map table describing a first level of port aggregation to be applied across a first set of the first physical ports. The first set is configured to couple, via a plurality of first physical links, with a plurality of second physical ports. One or more memory devices are communicatively coupled with the second physical ports and are accessible by the memory controller via the first physical links. The memory controller is configured to communicate, via the first physical links, the first level of port aggregation, and receive, via the first physical links, ordered data that is based on the first level of port aggregation.

One example described herein is a system operable according to a predefined transport protocol. The system comprises a first integrated circuit (IC) comprising a memory controller communicatively coupled with a plurality of first physical ports, wherein data communicated according to the transport protocol is unordered relative to different first physical ports. The system further comprises a second IC comprising a plurality of second physical ports that are communicatively coupled with a first set of the first physical ports via a plurality of first physical links. The system further comprises one or more memory devices that are communicatively coupled with the second physical ports and accessible by the memory controller via the first physical links. The first IC further comprises an identification map table describing a first level of port aggregation to be applied across the first set of the first physical ports. The second IC comprises a first distribution function configured to provide ordering to data communicated using the second physical ports, wherein the first distribution function is based on the first level of port aggregation.

One example described herein is a system operable according to a predefined transport protocol. The system comprises a first integrated circuit (IC) comprising a memory controller communicatively coupled with a plurality of first physical ports, wherein data communicated according to the transport protocol is unordered relative to different first physical ports. The system further comprises at least a second IC comprising a plurality of second physical ports that are communicatively coupled with a first set of the first physical ports via a plurality of first physical links. The system further comprises at least a third IC comprising a plurality of third physical ports that are communicatively coupled with a second set of the first physical ports via a plurality of second physical links. The system further comprises a plurality of memory devices that are communicatively coupled with the second physical ports or the third physical ports, wherein the plurality of memory devices are accessible by the memory controller via the first physical links or the second physical links. The first IC further comprises an identification map table describing a first level of port aggregation to be applied across the first set of the first physical ports, and a second level of port aggregation to be applied across the second set of the first physical ports. The second IC further comprises a first distribution function configured to provide ordering to data communicated using the second physical ports, wherein the first distribution function is based on the first level of port aggregation. The third IC further comprises a second distribution function configured to provide ordering to data communicated using the third physical ports. The second distribution function is based on the second level of port aggregation.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
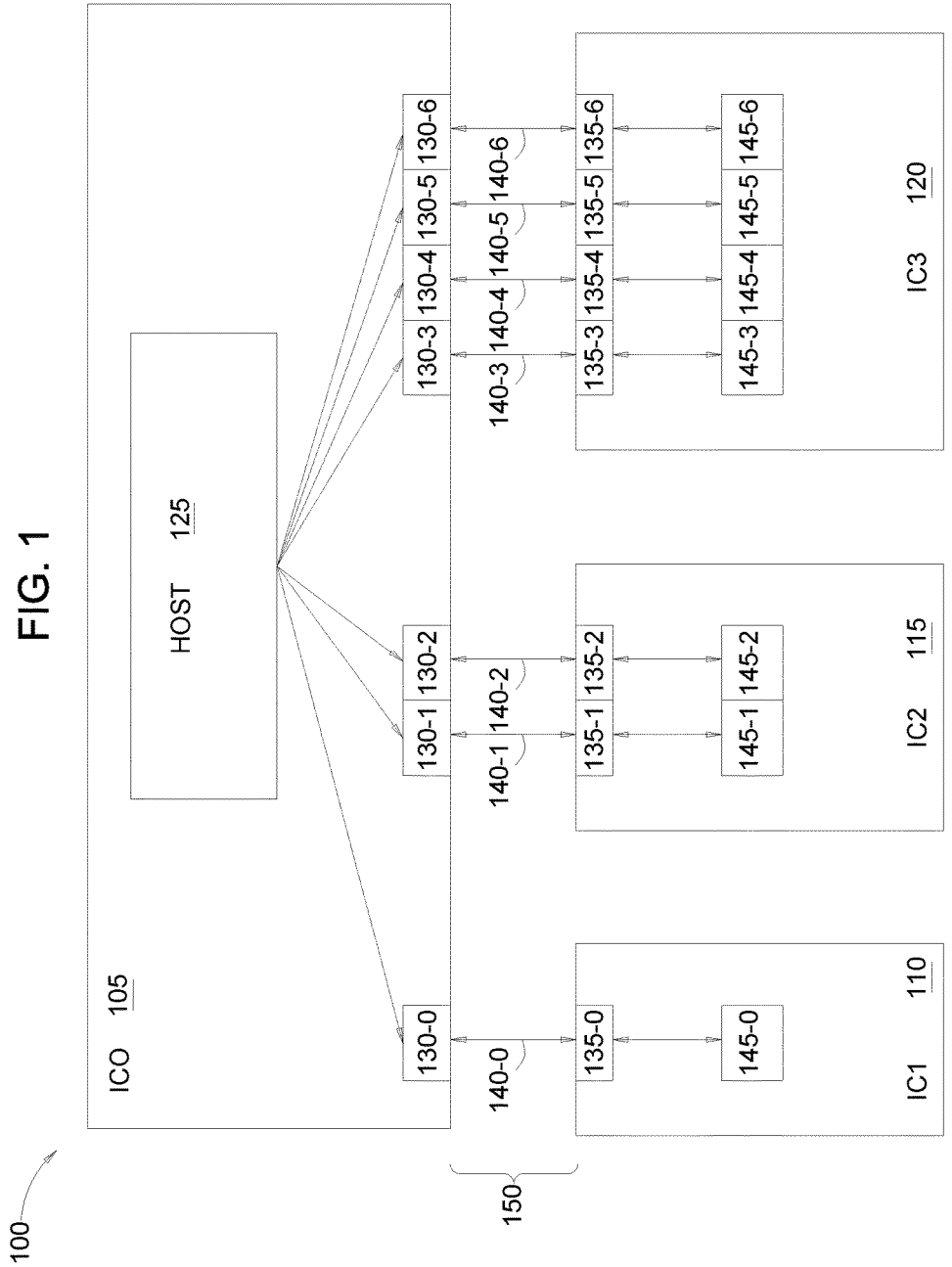
FIG. 1 is a block diagram of a system comprising a plurality of integrated circuits (ICs) operating according to a predefined transport protocol, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a system that is operable according to a predefined transport protocol. The system includes a first integrated circuit (IC) having a memory controller that is communicatively coupled with a plurality of first physical ports. Data that is communicated according to the transport protocol is unordered relative to different first physical ports. The system further includes a second IC that has a plurality of second physical ports that are communicatively coupled with a first set of the first physical ports via a plurality of first physical links. The system further includes one or more memory devices that are communicatively coupled with the second physical ports, and that are accessible by the memory controller via the first physical links. The first IC further includes an identification map table that describes a first level of port aggregation to be applied across the first set of the first physical ports, and the second IC includes a first distribution function that is configured to provide ordering to data communicated using the second physical ports. The first distribution function is based on the first level of port aggregation.

Such a system provides a number of benefits and advantages. The system may be configured to perform one or more common functions across multiple physical transports that require in-order semantics. In one example, the system may be configured to perform load/store memory accesses that are aggregated across multiple physical transports. In another example, the system may be configured to perform cache coherence through accesses that are aggregated across multiple physical transports. In some embodiments, multiple common functions may be performed concurrently.

In some embodiments, the common function(s) may be aggregated across multiple physical transports between two physical devices (e.g., two integrated circuits (ICs)). In some embodiments, the common function(s) may be aggregated across multiple physical transports between one source device and multiple destination devices. In some embodiments, the common function(s) may be aggregated across a varying number of physical transports (e.g., for varying levels of aggregation).

Further, the aggregated physical transports for the common function(s) may be addressed in non-linear stride address increments specified by the aggregation function. The addresses may be accessed through chained (or grouped) sequential accesses and may achieve the same function as multiple accesses performed over a single physical transport, which are typically in linear address increments.

FIG. 1 is a block diagram of a system 100 comprising a plurality of integrated circuits (ICs) operating according to a predefined transport protocol, according to an example. In some embodiments, data that is communicated according to the transport protocol is unordered relative to different physical ports. Stated another way, the timing of data communicated using a first physical port is independent of the timing of data communicated using a second physical port. Some non-limiting examples of the transport protocol include PCIe and Cache Coherent Interconnect for Accelerators (CCIX).

The system 100 comprises a plurality of ICs, which may be implemented in any suitable form. Some non-limiting examples of the plurality of ICs include microprocessors, digital signal processors (DSPs), application-specific integrated chip (ASICs), and field programmable gate arrays (FPGAs), or combinations thereof. As shown, the system 100 comprises four ICs: an IC0 105, an IC1 110, an IC2 115, and an IC3 120, although different numbers of ICs are also possible. The IC0 105 comprises a host 125 (such as a PCI host bridge or a PCIe root complex) coupled with a first plurality of physical ports 130-0, 130-1, . . . 130-6 (e.g., root ports).

The first plurality of physical ports 130-0, 130-1, . . . 130-6 are connected with a second plurality of physical ports 135-0, 135-1, . . . , 135-6 via a network 150. The network 150 may have any suitable form and scale. Some non-limiting examples of the network 150 include bus(es) within a singular computing device, a local area network (LAN), a wide area network (WAN), or the Internet. The network 150 comprises a plurality of physical links 140-0, 140-1, . . . , 140-6. In some embodiments, each of the plurality of physical links 140-0, 140-1, . . . , 140-6 comprises one or more conductive wires or traces. For example, each of the plurality of physical links 140-0, 140-1, . . . , 140-6 may comprise one or more lanes, in which each lane comprises a differential signaling pair. In other embodiments, the physical links 140-0, 140-1, . . . , 140-6 may comprise optical links.

As shown, the physical port 130-0 of IC0 105 is connected with the physical port 135-0 of IC1 110 via the physical link 140-0. The physical ports 130-1, 130-2 of IC0 105 are connected with the physical ports 135-1, 135-2 of IC2 115 via respective physical links 140-1, 140-2. The physical ports 130-3, 130-4, 130-5, 130-6 of IC0 105 are connected with the physical ports 135-3, 135-4, 135-5, 135-6 of IC3 120 via respective physical links 140-3, 140-4, 140-5, 140-6.

Although each of the physical links 140-0, 140-1, . . . , 140-6 is shown as directly linking a physical port 130-0, 130-1, . . . 130-6 with another physical port 135-0, 135-1, . . . , 135-6, alternate implementations of the network 150 may include one or more intermediate devices (such as a switching device).

A plurality of devices 145-0, 145-1, . . . , 145-6 are connected with the second plurality of physical ports 135-0, 135-1, . . . , 135-6. As shown, device 145-0 is included in IC1 110, devices 145-1, 145-2 is included in IC2 115, and devices 145-3, 145-4, 145-5, 145-6 are included in IC3 120. In an alternate implementation, one or more of the plurality of devices 145-0, 145-1, . . . , 145-6 are external to the respective IC.

The devices 145-0, 145-1, . . . , 145-6 may have any suitable implementation. In some embodiments, the devices 145-0, 145-1, . . . , 145-6 comprise memory devices such as storage-class (or "persistent") memory. The storage-class memory may have any suitable implementation, such as non-volatile dual inline memory modules (NV-DIMMs), 3D XPoint, resistive random access memory (ReRAM), spin-transfer torque magnetic RAM (STT-MRAM), and so forth.

Although the devices 145-1, 145-2 are included in IC2 115, device discovery processes used in PCIe are based on the corresponding physical ports 135-1, 135-2. Therefore, the devices 145-1, 145-2 are discovered and addressed as unique PCIe devices, and cannot have a common function under the PCIe transport protocol, such as load/store memory accesses and cache coherence.

Figure 2:
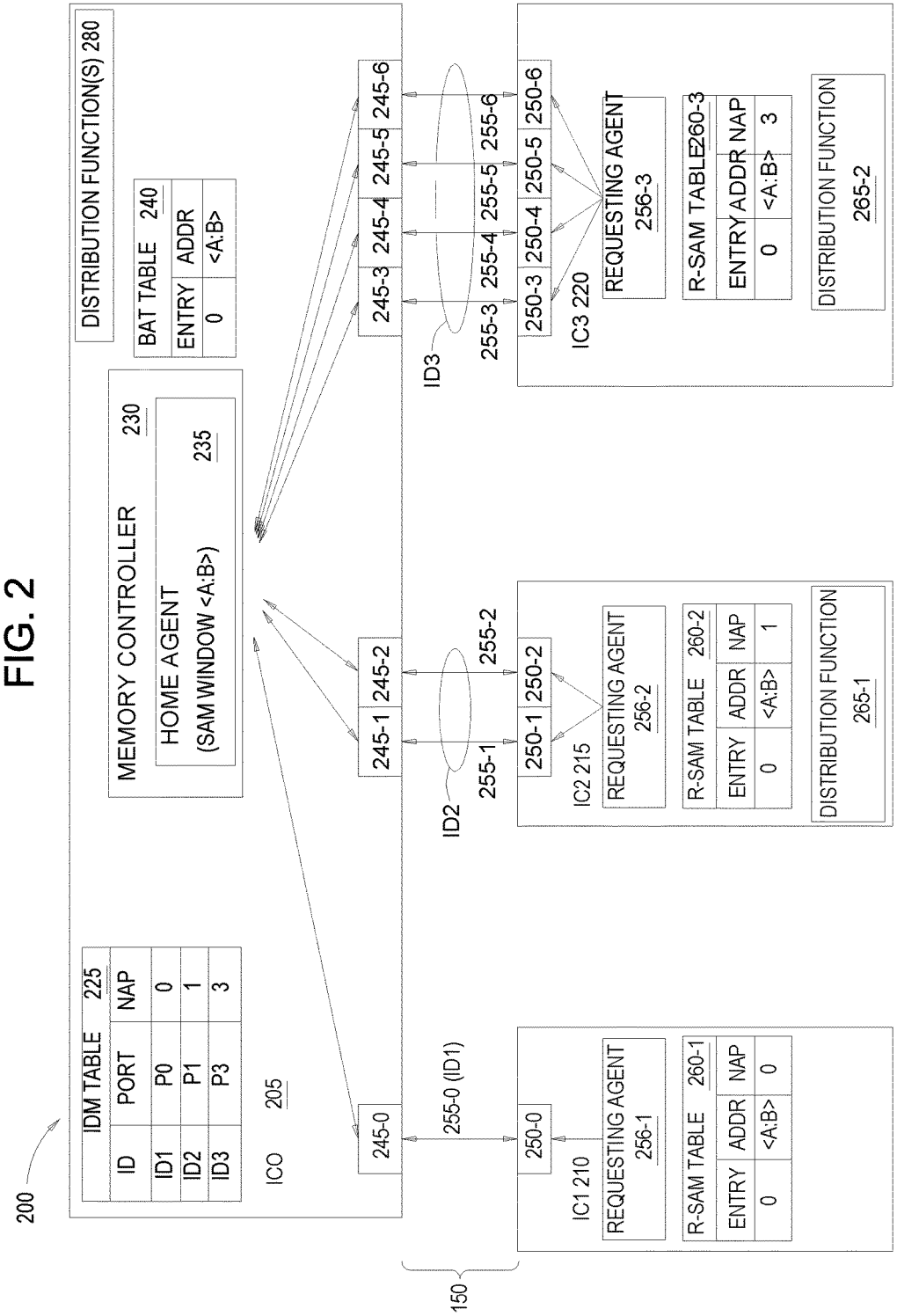
FIG. 2 is a block diagram of a system implementing transparent port aggregation, according to an example.

FIG. 2 is a block diagram of a system 200 implementing transparent port aggregation, according to an example. In some embodiments, the system 200 implements CCIX transport protocol over PCIe ports. Alternate embodiments of the system 200 may use any suitable transport protocol, whether standardized or proprietary, in which data communicated according to the transport protocol is unordered relative to different physical ports. Stated another way, the timing of data communicated using a first physical port is independent of the timing of data communicated using a second physical port.

The system 200 comprises a plurality of ICs, which may be implemented in any suitable form. As shown, the system 200 comprises four ICs: an IC0 205, an IC1 210, an IC2 215, and an IC3 220, although different numbers of ICs are also possible. The IC0 205 comprises a memory controller 230 configured to implement a host agent 235. The host agent 235 is coupled with a first plurality of physical ports 245-0, 245-1, ..., 245-6. The host agent 235 is configured to access memory defined in the system address map (SAM) window from <A:B>, as shown in Base Address Table (BAT) 240.

The BAT 240 represents a data structure used to identify the memory range that is "claimed" by the device. As shown, the memory range <A:B> with Base Address A is being claimed by IC0 205. Thus, the BAT 240 can be extended to a plurality of devices, each claiming its own sub-section of the overall System Address Map (SAM). Similarly, the BAT 240 can also be extended to have a plurality of entries (a single Entry 0 is illustrated), where each entry allows the IC0 205 to claim a plurality of SAM windows. As a result, transparent port aggregation can be achieved over a plurality of devices, a plurality of transport connections, and/or a plurality of System Address Map windows.

The first plurality of physical ports 245-0, 245-1, ... 245-6 is connected with a second plurality of physical ports 250-1, 250-1, ..., 250-6 via the network 150. The network 150 may have any suitable form and scale. The network 150 comprises a plurality of physical links 255-0, 255-1, ..., 255-6. In some embodiments, each of the plurality of physical links 255-0, 255-1, ..., 255-6 comprises one or more conductive wires or traces. For example, each of the plurality of physical links 255-0, 255-1, ..., 255-6 may comprise one or more lanes, in which each lane comprises a differential signaling pair. In other embodiments, the physical links 255-0, 255-1, ..., 255-6 may comprise optical links.

As shown, the physical port 245-0 of IC0 205 is connected with the physical port 250-0 of IC1 210 via the physical link 255-0. The physical ports 245-1, 245-2 of IC0 205 are connected with the physical ports 255-1, 255-2 of IC2 215 via respective physical links 255-1, 255-2. The physical ports 245-3, 245-4, 245-5, 245-6 of IC0 205 are connected with the physical ports 250-3, 250-4, 250-5, 250-6 of IC3 220 via respective physical links 255-3, 255-4, 255-5, 255-6.

Although each of the physical links 140-0, 140-1, ..., 140-6 is shown as directly linking a physical port 130-0, 130-1, ... 130-6 with another physical port 135-0, 135-1, ..., 135-6, alternate implementations of the network 150 may include one or more intermediate devices (such as a switching device).

IC1 210 comprises a requesting agent 256-1 that is communicatively coupled with one physical port 250-0, IC2 215 comprises a requesting agent 256-2 that is communicatively coupled with two physical ports 250-1, 250-2, and IC3 220 comprises a requesting agent 256-3 that is communicatively coupled with four physical ports 250-3, 250-4, 250-5, 250-6. In some embodiments, a handshake mechanism included in CCIX permits the requesting agents 256-1, 256-2, 256-3 to operate as common requesting agents in the CCIX domain and correspond to multiple physical ports, although each physical port would be separately identified in the PCIe domain. Thus, in the PCIe domain, the system 200 appears as having a root complex (i.e., included in the host agent 235), and seven endpoints (i.e., the physical ports 250-1, 250-1, ..., 250-6). In the CCIX domain, the system 200 appears as the host agent 235 and three distinct requesting agents 256-1, 256-2, 256-3.

As shown, the host agent 235 has a point-to-point (P2P) transport connection with the requesting agent 256-1. The host agent 235 also has aggregated transport connections with the requesting agents 256-2, 256-3, each of which has a respective level of port aggregation. Although two-port and four-port levels are shown in system 200, alternate implementations may use any suitable level(s) of port aggregation. Further, in some embodiments, the aggregation level(s) may be dynamically updated by the host agent 235.

To accomplish the port aggregation, in some embodiments the IC0 205 comprises an identification map (IDM) table 225 that describes one or more levels of port aggregation to be applied across various sets of the plurality of physical ports 245-0, 245-1, ..., 245-6. In some embodiments, the IDM table 225 may also specify that no aggregation is to be applied for one or more of the physical ports 245-0, 245-1, ..., 245-6. The IDM table 225 specifies a number of aggregated ports (NAP) to be associated with a logical identifier. As shown, the IDM table 225 associates the physical port 245-0 (shown as port P0) and no aggregated ports with a first logical identifier ID1. The IDM table 225 associates the physical port 245-1 (shown as port P1) and one (1) aggregated port with a second logical identifier ID2. The IDM table 225 associates the physical port 245-3 (shown as port P3) and three (3) aggregated ports with a third logical identifier ID3.

In some embodiments, the NAP specifies one or more ports that are in sequence with the identified port. For example, specifying port P3 and three (3) aggregated ports in the IDM table 225 corresponds to the "next" three physical ports 245-4, 245-5, 245-6. In alternate embodiments, the IDM table 225 may comprise additional information that specifically identifies which physical ports that will be aggregated under a particular logical identifier, so that the aggregated ports may include non-sequential ports.

In some embodiments, the requesting agents 256-1, 256-2, 256-3 each comprises a respective requesting agent system address map (R-SAM) table 260-1, 260-2, 260-3 that specifies how data communicated across the corresponding physical links 255-0, 255-1, ..., 255-6 should be ordered. In some embodiments, the R-SAM tables 260-2, 260-3 comprise a respective distribution function 265-1, 265-2 that provides the ordering to the communicated data. In some embodiments, the distribution functions 265-1, 265-2 comprises a hash mask data structure for distributing traffic between the different aggregated ports.

In some embodiments, the distribution functions 265-1, 265-2 are based on the corresponding level of port aggregation. For example, the distribution functions 265-1, 265-2 may be configured to receive values of the NAP and to determine the distribution based on the values. One example of a distribution function 265-1, 265-2 is described below with respect to FIG. 6.

Thus, using the IDM table 225 and the distribution functions 265-1, 265-2, the system 200 enables unidirectional data communication from the requesting agents 256-1, 256-2, 256-3 to the host agent 235 over the aggregated physical ports. The unidirectional communication may enable a load/store memory access functionality by the host agent 235. In this way, the system 200 may be configured to transparently layer port aggregation over existing transport protocols (such as PCIe or CCIX).

In some embodiments, the IC0 205 further comprises one or more distribution functions 280, which enables bidirectional data communication between the host agent 235 and the requesting agents 256-1, 256-2, 256-3 over the aggregated physical ports. The bidirectional communication may enable a cache coherence functionality between the host agent 235 and the requesting agents 256-1, 256-2, 256-3. In some embodiments, the one or more distribution functions 280 comprise hash mask data structure(s) for distributing traffic between the different aggregated ports.

In some embodiments, the one or more distribution functions 280 are the same as the distribution functions 265-1, 265-2. For example, if the distribution function 265-1 specifies a predefined first data granularity level, the one or more distribution functions 280 may specify the first data granularity level. By using the same distribution functions 265-1, 265-2, 280, same-address hazard detection may be performed, as well as ensuring correct ordering of various coherence functions (e.g., for CCIX coherent requests from the requesting agents 256-1, 256-2, 256-3 to the host agent 235 across aggregated physical ports, as well as CCIX coherent snoops from the host agent 235 to the requesting agents 256-1, 256-2, 256-3).

In some embodiments, the distribution functions 265-1, 265-2, 280 may enable chained (or grouped) sequential accesses over aggregated ports in non-linear stride increments. The level of chained accesses and the associated functionality may be specific to a particular pair of ICs and/or to a level of port aggregation between the particular pair. The non-linear stride increments may differ for different groups of aggregated ports. Stated another way, a first distribution function may specify a predefined first data granularity level, and a second distribution function may specify a predefined second data granularity level that is different than the first data granularity level.

In this way, the distribution functions 265-1, 265-2, 280 may be used to maintain ordered data sets, where the sets are defined by the port aggregation stride length specified by the distribution function. Otherwise, non-linear stride increments would not have been available for a port-aggregated function. Beneficially, the ability to specify the stride length for port aggregation may enable lower-latency Storage Class Memory used for load-store functionality and/or cache coherency functionality.

In one non-limiting example, the P2P transport connection across physical link 255-0 supports a cache coherence functionality between the host agent 235 and the requesting agent 256-1 with a data granularity of 64-bit cache line strides. The distribution function 265-1 supports a load/store memory access functionality, with a data granularity of 4 kilobit (kb) strides, between the host agent 235 and the requesting agent 256-2 across a first set of aggregated physical ports 250-1, 250-2. The distribution function 265-2 supports both the load/store memory access and cache coherence functionality between the requesting agent 256-3 with a data granularity of 16 megabit (Mb) strides.

Figure 3:
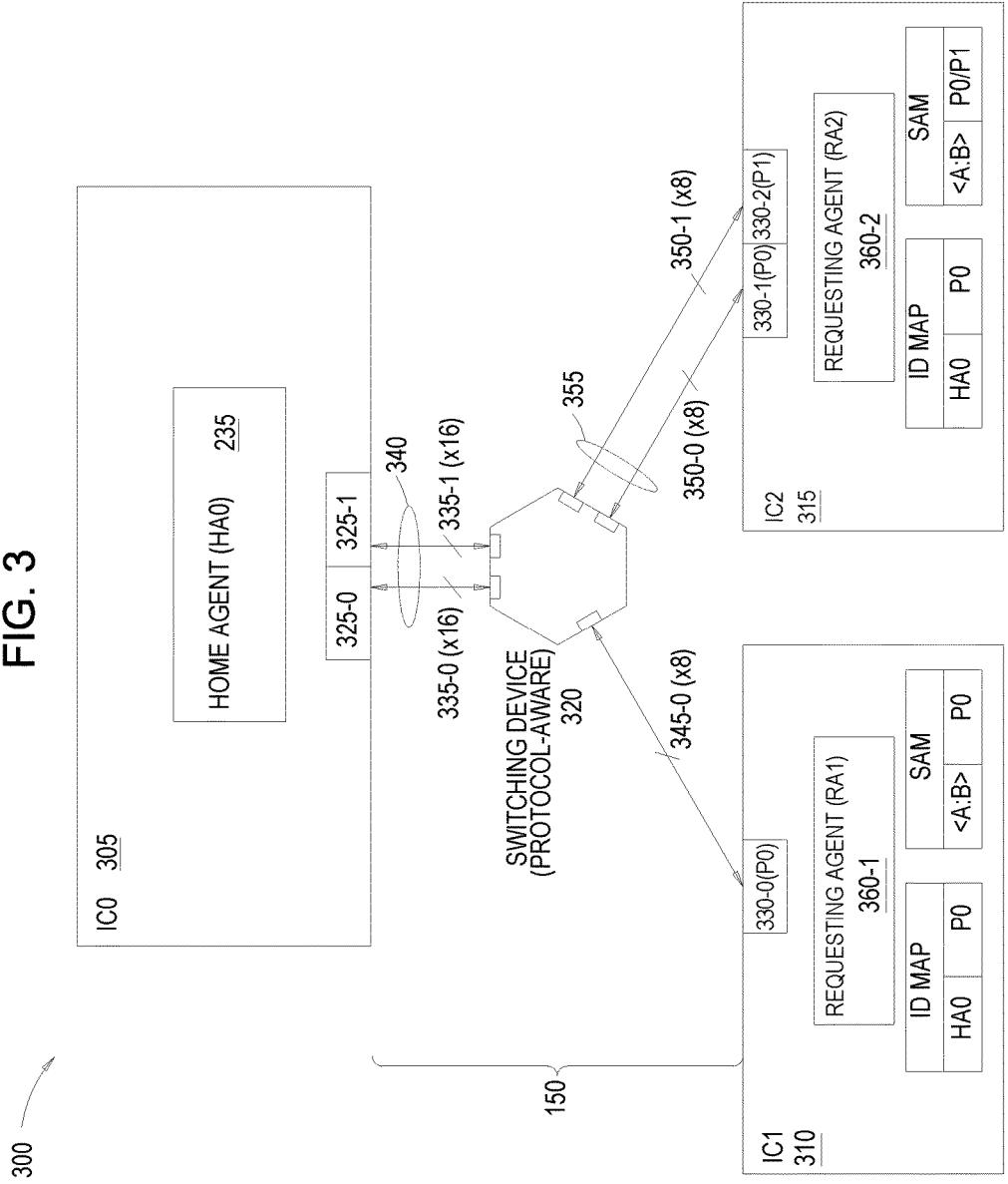
FIG. 3 is a block diagram of a system comprising a protocol-aware switching device, according to an example.

FIG. 3 is a block diagram of a system 300 comprising a protocol-aware switching device, according to an example. As discussed herein, "protocol-aware" indicates that the switching device is capable of performing one or more common functions across multiple physical transports that require in-order semantics, such as a load/store protocol and/or a cache coherency protocol. The system 300 may be used in conjunction with other features discussed herein, such as those of system 200.

The system 300 comprises a plurality of ICs, which may be implemented in any suitable form. As shown, the system 300 comprises three ICs: an IC0 305, an IC1 310, and an IC2 315, although different numbers of ICs are also possible. The IC0 305 comprises a host agent 235 (HA0), the IC1 310 comprises a requesting agent 360-1 (RA1), and the IC2 315 comprises a requesting agent 360-2 (RA2). The host agent 235 is coupled with a first plurality of physical ports 325-0, 325-1. The first plurality of physical ports 325-0, 325-1 is connected with a second plurality of physical ports 330-0, 330-1, 330-2 via the network 150. The physical port 330-0 is included in IC1 310, and the physical ports 330-1, 330-2 are included in IC2 315.

The network 150 comprises a protocol-aware switching device 320. In some embodiments, the switching device 320 is operable according to the transport protocol associated with CCIX, although other transport protocols are also possible. In some embodiments, the switching device 320 is configured to terminate all data packets received from the host agent 235 and distribute the data packets to the requesting agents 360-1, 360-2, and vice versa.

The switching device 320 is communicatively coupled with the physical port 325-0 via a 16-lane (×16) physical link 335-0, and with the physical port 325-1 via a 16-lane physical link 335-1. In some embodiments, each lane comprises a differential signaling pair. The switching device 320 is further communicatively coupled with the physical port 330-0 via an 8-lane (×8) physical link 345-0, with the physical port 330-1 via an 8-lane physical link 350-0, and with the physical port 330-2 via an 8-lane physical link 350-1. In some embodiments, each of the physical links 335-0, 335-1, 345-0, 350-0, 350-1 may have a same transfer rate, but this is not a requirement.

The switching device 320 has a logical, non-aggregated connection with the requesting agent 360-1 via the physical link 345-0. Stated another way, the switching device 320 is configured to distribute data packets over the single physical link 345-0 in such a manner as to permit functions (e.g., load/store memory accesses, cache coherence) between the host agent 235 and the requesting agent 360-1, without the need for applying a distribution function across multiple aggregated physical links. Using the same network 150, the host agent 235 has two physical P2P transport connections (over the physical links 335-0, 335-1) to the protocol-aware switching device 320, which is configured to transport logically-aggregated coherent link traffic with the requesting agent 360-2. In some embodiments, port aggregation is applied to the physical and logical connections (as aggregated links 340) between the host agent 235 and the switching device 320, and between the requesting agent 360-2 and the switching device 320 (as aggregated links 355). For example, the host agent 235 may comprise an IDM table and/or one or more distribution functions, and the requesting agents 360-1, 360-2 may comprise distribution functions, as discussed above with respect to FIG. 2.

Figure 4:
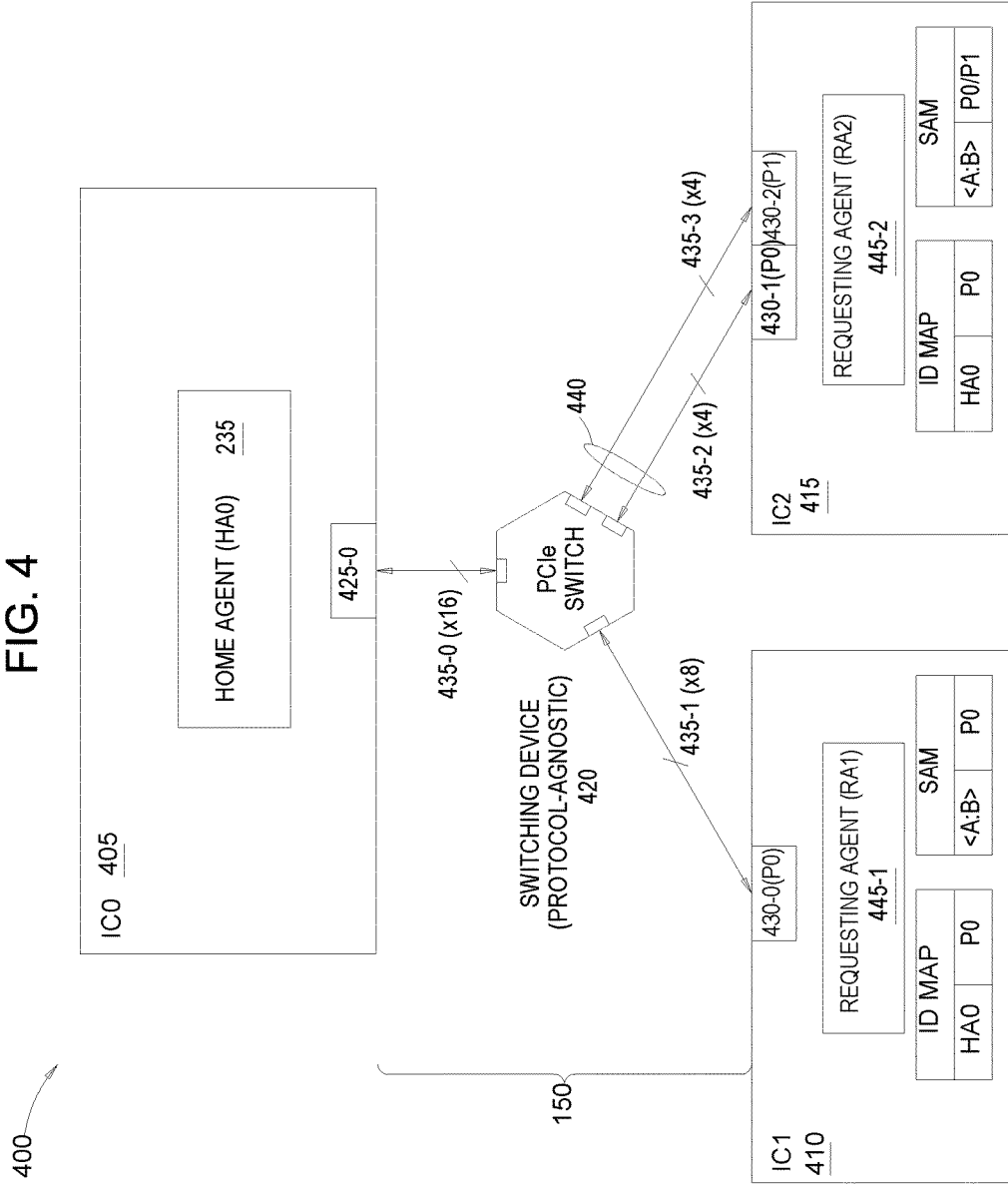
FIG. 4 is a block diagram of a system comprising a protocol-unaware switching device, according to an example.

FIG. 4 is a block diagram of a system 400 comprising a protocol-unaware switching device, according to an example. As discussed herein, "protocol-unaware" indicates that the switching device is not capable of performing one or more common functions across multiple physical transports that require in-order semantics, such as a load/store protocol and/or a cache coherency protocol. Stated another way, the switching device may be configured to perform only transport protocol switching that is transparent to the protocol being carried. The system 400 may be used in conjunction with other features discussed herein, such as those of system 200.

The system 400 comprises a plurality of ICs, which may be implemented in any suitable form. As shown, the system 400 comprises three ICs: an IC0 405, an IC1 410, and an IC2 415, although different numbers of ICs are also possible. The IC0 405 comprises a host agent 235 (HA0), the IC1 410 comprises a requesting agent 445-1 (RA1), and the IC2 415 comprises a requesting agent 445-2 (RA2). The host agent 235 is communicatively coupled with a physical port 425-0. The physical port 425-0 is connected with a second plurality of physical ports 430-0, 430-1, 430-2 via the network 150. The physical port 430-0 is included in IC1 410, and the physical ports 430-1, 430-2 are included in IC2 415.

The network 150 comprises a protocol-unaware switching device 420 (or "switching device 420"). In some embodiments, the switching device 420 comprises a PCIe switch and is unaware of the CCIX transport protocol. The switching device 420 is communicatively coupled with the physical port 425-0 via a 16-lane (×16) physical link 435-0. In some embodiments, each lane comprises a differential signaling pair. The switching device 420 is further communicatively coupled with the physical port 430-0 via an 8-lane (×8) physical link 435-1, with the physical port 430-1 via a 4-lane (×4) physical link 435-2, and with the physical port 430-2 via a 4-lane physical link 435-3. In some embodiments, each of the physical links 435-0, 435-1, 435-2, 435-3 may have the same transfer rate, but this is not a requirement.

The host agent 235 has a logical, non-aggregated connection with the requesting agent 445-1. Using the same network 150, the host agent 235 has a physical P2P transport connection with the switching device 420, and has a logically-aggregated coherent link with requesting agent 445-2. In some embodiments, port aggregation is applied to the physical links (as aggregated links 440) between the switching device 420 and the requesting agent 445-2. For example, the host agent 235 may comprise an IDM table and/or one or more distribution functions, and the requesting agents 455-1, 445-2 may comprise distribution functions, as discussed above with respect to FIG. 2.

Figure 7:
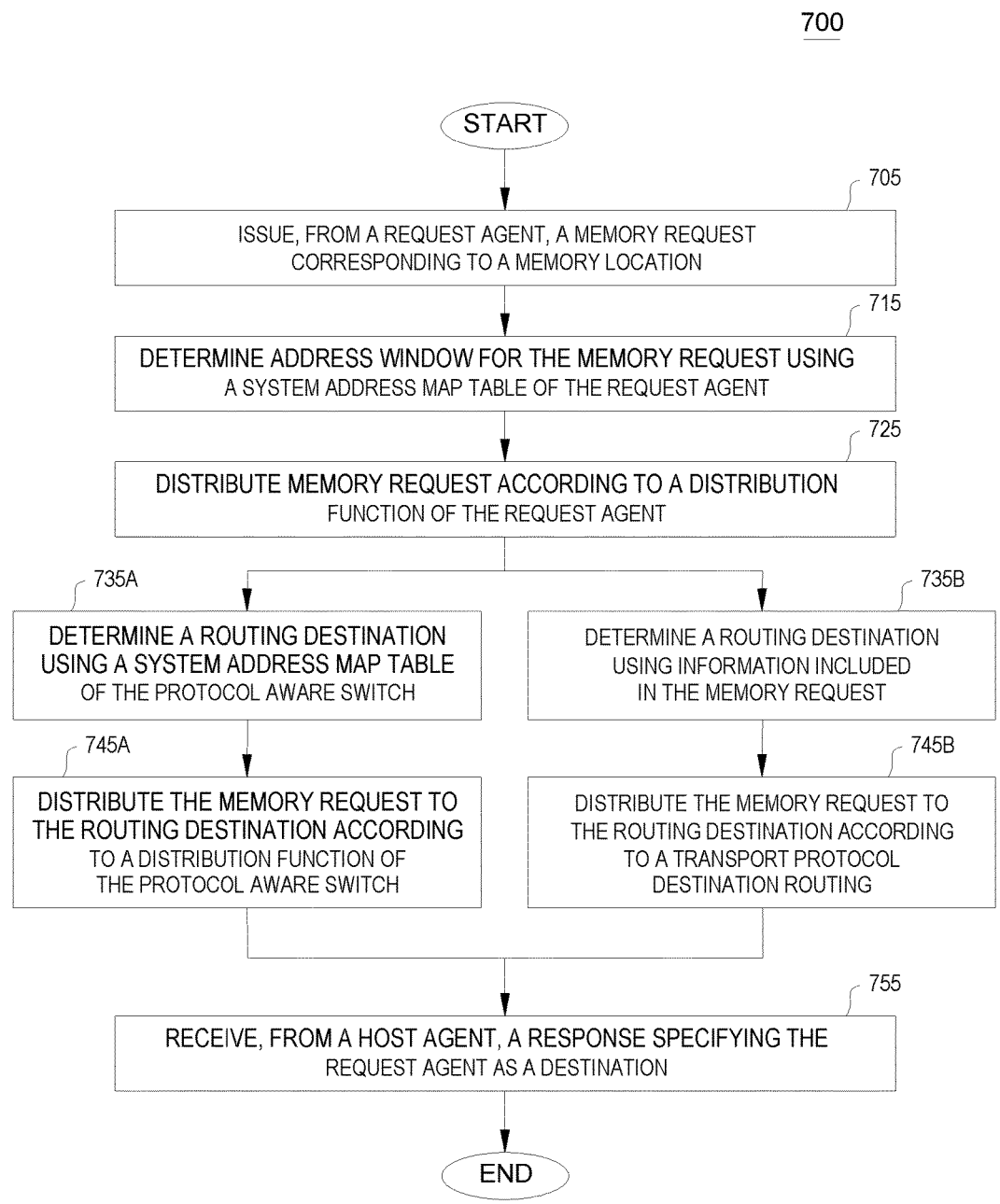
FIG. 7 illustrates a method of processing a memory request from a requesting agent, according to an example.

Next, FIG. 7 illustrates a method 700 of processing a memory request from a requesting agent, according to an example. The method 700 may be used in conjunction with other embodiments described herein, such as the system 300 of FIG. 3 or the system 400 of FIG. 4.

The method 700 is further described with respect to the following example parameters. Assume that memory address locations X1, X2, X3, X4, . . . , Xn+1 are all 64-byte (64B) aligned 64B addresses, and that the memory address locations X1, X2, X3, X4, . . . , Xn+1 are consecutive 64B addresses, i.e., X2=X1+64B, and so forth. Further, memory address location X1 is also 128B aligned (such that Address X3 is also 128B aligned). Assume further that the distribution function (e.g., distribution function 265 of FIG. 2) is 128B. The hash mask (e.g., hash mask 610 of FIG. 6) is set such that the Hash Mask[7]=1 and all other Hash Mask bits=0.

For an input address (e.g., input address 605 of FIG. 6) of X1, X2, X3, X4, . . . , Xn+1, the mask result (e.g., mask result 615 of FIG. 6) and aggregated port selection value (e.g., aggregated port selection value 620 of FIG. 6) are [NAP:0] are zero for (X1, X2), (X5, X6) and one for (X3, X4), (X7, X8).

The memory address locations X1, X2, X3, X4, . . . , Xn are all "homed" at Host agent 0 (HA0) 235, i.e., the addresses fall within the SAM Window <A:B>. Thus, HA0 manages the maintenance of cache coherency of memory locations X1-Xn accessed/cached by requesting agents (e.g., requesting agents 360 of FIG. 3).

The method 700 begins at block 705, where a requesting agent issues a memory request corresponding to a memory location. For example, the requesting agent RA2 (e.g., requesting agent 360-2 of FIG. 3, requesting agent 445-2 of FIG. 4) issues memory requests (e.g., cacheable Reads) to X1, X2, X3, and X4.

At block 715, the requesting agent determines an address window for the memory request using a system address map (SAM) table of the requesting agent. For example, the requesting agent RA2 references the R-SAM Table (e.g., the R-SAM table 260 of FIG. 2) and performs an address decode to determine that the accesses to Xn are to Address Window <A:B>. Furthermore, the R-SAM Table indicates NAP=1, i.e. the Requests need to be routed with 2-port-aggregation.

The requesting agent RA2 commences executing the port-aggregation algorithm for requesting agents. Because NAP>0, indicating port aggregation, the requesting RA2 references the R-SAM Table to determine the PortID that is now the Base-PortID (BPID) for port-aggregation is P0 (corresponding to port 330-1 of FIG. 3, port 430-1 of FIG. 4).

Because NAP=1, indicating 2-Port Aggregation, the Port-Aggregation algorithm requires that the subsequent aggregated Ports be linearly enumerated. Thus RA2, as part of the algorithm determines that the BPID+1 port must be P1 (corresponding to port 330-2 of FIG. 3, port 430-2 of FIG. 4).

At block 725, the requesting agent distributes the memory request according to a distribution function of the requesting agent. For example, the requesting agent RA2 executes the Port-Aggregation distributed algorithm, and X1, X2 are routed to P0 and X3, X4 are routed to P1.

At block 735A, a protocol-aware switch disposed between the requesting agent and the host agent determines a routing destination using a system address map table of the protocol-aware switch.

For example, with reference to FIG. 3, IC2 is setup for the protocol-aware switching device 320. A P0 (corresponding to port 330-1) data structure indicates the transport protocol destination of IC2 P0 Egress Requests is a port on the protocol-aware switching device 320 connected to the transport (e.g., physical link 350-0). Similarly, a P1 (corresponding to port 330-2) data structure indicates the transport protocol destination of IC2 P1 Egress Requests is a port on the protocol-aware switching device 320 connected to the transport (e.g., physical link 350-1). The R-SAM Table on the protocol-aware switching device 320 references the R-SAM Table 260 and performs an address decode to determine that the accesses to Xn should be routed to Port P0 330-0.

At block 745A, the protocol-aware switch distributes the memory request to the routing destination according to a distribution function of the protocol-aware switch. The protocol-aware switching device 320, responsive to receiving the requests from IC2 P0& P1, performs address decoding using the R-SAM Table of the protocol-aware switching device 320, similar to discussed above. Upon determining the decode results indicate a port-aggregated destination, the protocol-aware switching device 320 may further execute the port-aggregation algorithm similar to discussed above. The protocol-aware switching device 320 may further route the requests to the aggregated port destinations (e.g., ports 325-0 and 325-1).

At block 735B, a protocol-agnostic switch disposed between the requesting agent and the host agent determines a routing destination using information included in the memory request.

For example, with reference to FIG. 4, IC2 415 is setup for the switching device 420 (e.g., a PCIe switch). Both the IC2 [415] P0 [430-1] and P1 [430-2] data structures indicate that the transport protocol destination of IC2 P0/P1 Egress Requests is the Port [425-0] on the Host agent Device IC0 [405].

The switching device 420, responsive to receiving the requests from P0, P1 of IC2, interprets the header of the PCIe packet as the switching device 420 is not protocol-aware. The switching device 420 executes the transport protocol destination routing for that packet, and forwards the packets from ports P0, P1 onto port 425-0.

At block 745B, the protocol-agnostic switch distributes the memory request to the routing destination according to a transport protocol destination routing. Assume that the requesting agent RA1 (e.g., requesting agent 360-1 of FIG. 3 and requesting agent 445-1 of FIG. 4) issues memory requests (e.g., cacheable reads) to X1, X2, X3, and X4, the same algorithm is followed: R-SAM Table decodes Xn to <A:B>, NAP=0 indicates no Port Aggregation, and depending on PCIe or Protocol Switch, the destination transport ID on those packets are for port 425-0 or the protocol-aware switching device 320 port connected to link 345-0, respectively.

The requesting agent RA1 references the R-SAM Table 260 and performs an address decode to determine that the accesses to Xn should be routed to Port P0 (e.g., port 330-0 or 430-0).

A P0 (e.g., port 430-0) data structure indicates the destination of all RA1 requests is a port on the protocol-aware switching device 320. The R-SAM Table on the protocol-aware switching device 320 references the R-SAM Table 260 and performs an address decode to determine that the accesses to Xn should be routed to Port P0 (e.g., port 330-0 or 430-0).

At block 755, the requesting agent receives, from the host agent, a response specifying the requesting agent as a destination.

The host agent HA0 [235] on IC0 [305 or 405] responds to requests arriving from either RA1 or RA2, described above, using the same destination AgentID as the Source ID of the request, i.e., with the destination of the response packets being either RA1 or RA2. The host agent HA0 also routes the response packets to the same Ports on IC0 (e.g., ports 325-0, 325-1, or 425-0) as the port that the requests arrived on. Selection of the destination port is a protocol layer requirement, and does not rely on data structures such as SAM or IDM Tables to make this determination.

Furthermore, Ports on IC0 (e.g., ports 325-0, 325-1, or 425-0) have a port data structure that attaches the destination transport ID accordingly. In the example of FIG. 3, a destination transport ID for the switching device 320 ports at the ends of physical links 335-0, 335-1. In the example of FIG. 4, a requesting agent RA1 destination is a destination transport ID for port 430-0. A requesting agent RA2 destination is a destination transport ID for port 430-1 or 430-2.

Further, the host agent HA0 235 on IC0 (e.g., IC0 305 or 405) may send snoop requests to either requesting agents RA1 or RA2, using the same address to port resolution techniques described above. For example, the host agent HA0 snoops use R-SAM table decode, and a NAP value-based determination whether the snoops go to aggregated ports or not, and the same aggregation function to determine which snoop goes to ports P0 or P1 of IC0.

The host agent HA0 may execute the same port aggregation algorithm and may have the same distribution function as RA2, ensuring that HA0-initiated snoops to requesting agent RA2 will travel along the same IC0-IC2 port pairs and ensure that coherency enforcement related hazard detection, for example a snoop/writeback hazard detection can be achieved.

Method 700 ends following completion of block 755.

Figure 5:
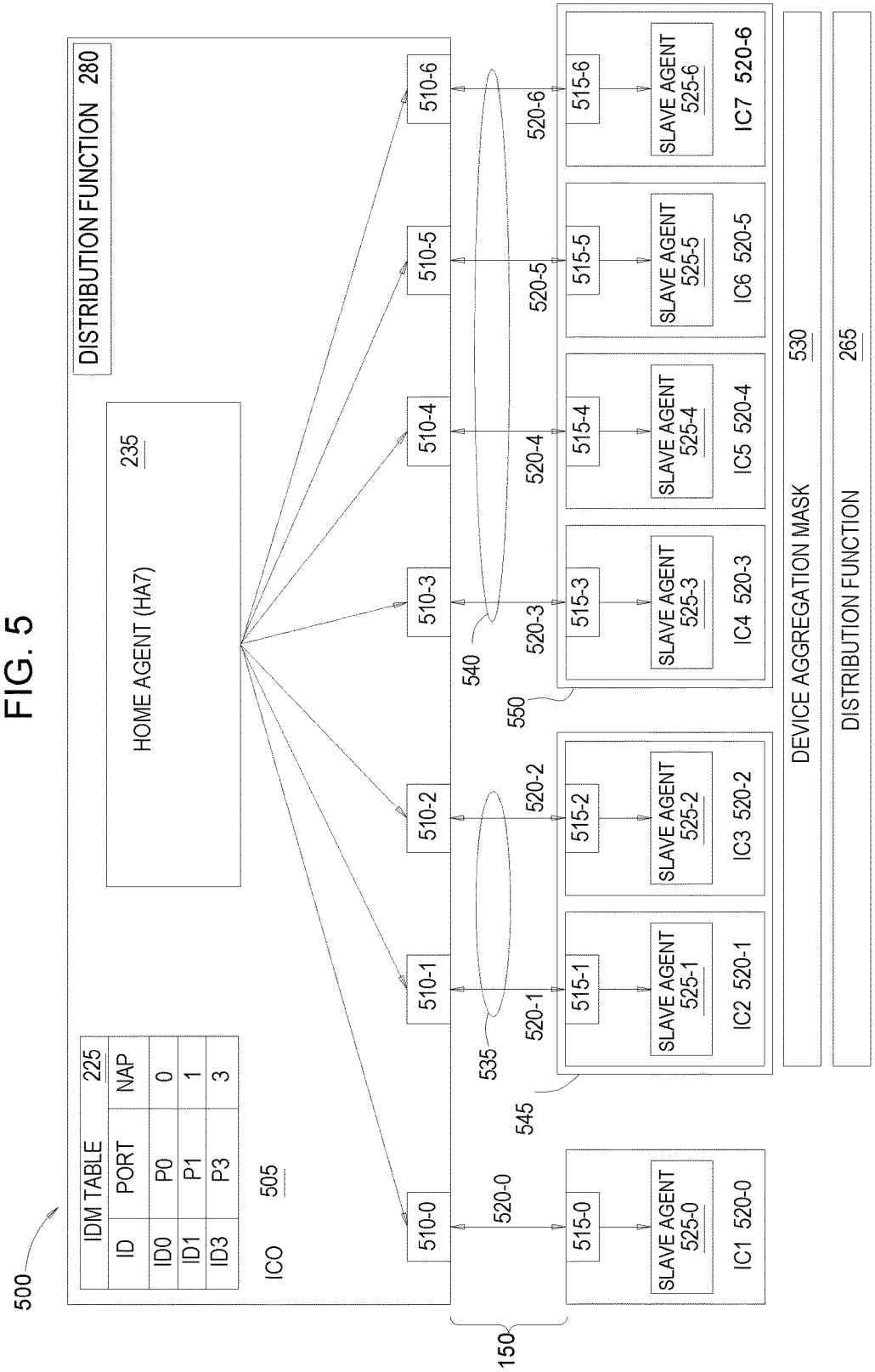
FIG. 5 is a block diagram of a system implementing transparent device aggregation, according to an example.

FIG. 5 is a block diagram of a system 500 implementing transparent device aggregation, according to an example. The system 500 may be used in conjunction with other features discussed herein, such as those of system 200.

The system 500 comprises a plurality of ICs, which may be implemented in any suitable form. As shown, the system 500 comprises seven ICs: an IC0 505, an IC1 520-0, an IC2 520-1, an IC3 520-2, an IC4 520-3, an IC5 520-4, an IC6 520-5, and an IC7 520-6, although different numbers of ICs are also possible. The IC0 505 comprises a host agent 235 (HA7), and the ICs 520-0, 520-1, . . . , 520-6 comprise respective slave agents 525-0, 525-1, . . . , 525-6. For example, the host agent 235 may have expansion memory distributed among the slave agents 525-0, 525-1, . . . , 525-6.

The host agent 235 is communicatively coupled with a first plurality of physical ports 510-0, 510-1, . . . , 510-6, which are communicatively coupled with a second plurality of physical ports 515-0, 515-1, . . . , 515-6 via the network 150. Each of the physical ports 515-0, 515-1, . . . , 515-6 is included in a respective one of the ICs 520-0, 520-1, . . . , 520-6.

The network 150 comprises a plurality of physical links 520-0, 520-1, . . . , 520-6. In some embodiments, each of the plurality of physical links 520-0, 520-1, . . . , 520-6 comprises one or more conductive wires or traces. For example, each of the plurality of physical links 520-0, 520-1, . . . , 520-6 may comprise one or more lanes, in which each lane comprises a differential signaling pair. In other embodiments, the physical links 520-0, 520-1, . . . , 520-6 may comprise optical links.

The host agent 235 comprises an IDM table 225 describing one or more levels of port aggregation applied to the physical links 520-0, 520-1, . . . , 520-6. As shown, no aggregation is applied to the physical link 520-0, two-port aggregation is applied to the physical links 520-1, 520-2, and four-port aggregation is applied to the physical links 520-3, 520-4, 520-5, 520-6. The host agent 235 further comprises a distribution function 280.

In the system 500, a device aggregation mask 530 describes one or more levels of device aggregation applied to the slave agents 525-0, 525-1, . . . , 525-6. The system 500 may contemporaneously support varying levels of aggregation between different logical pairings with the host agent 235. As shown, no aggregation is applied to the slave agent 525-0, two-device aggregation is applied to the slave agents 525-1, 525-2 (as an aggregation group 545), and four-device aggregation is applied to the slave agents 525-3, 525-4, 525-5, 525-6 (as aggregation group 550). Other aggregation levels are also possible.

Within each aggregation group 545, 550, one or more common functions (such as load/store memory accesses and cache coherence) may be applied across the corresponding slave agents. In one non-limiting example, the slave agent 525-0 performs one or more first functions, the slave agents 525-1, 525-2 of aggregation group 545 perform one or more second functions, and the slave agents 525-3, 525-4, 525-5, 525-6 of aggregation group 550 perform one or more third functions. Further, one or more distribution functions 265 may be associated with the devices of aggregation groups 545, 550.

Within the system 500, the number of physical links 520-0, 520-1, . . . , 520-6 extending between the host agent 235 and the slave agents 525-0, 525-1, . . . , 525-6 is transparent to the host agent 235. Further, the number of aggregation groups 545, 550 may also be transparent to the host agent 235.

Further, while the system 500 illustrates one function pair (i.e., host agent 235 with slave agent 525-0 and aggregation groups 545, 550), alternate embodiments may include multiple function pairs (i.e., multiple host agents 235 coupled with multiple slave agents or aggregation groups) that are operating concurrently.

Additionally, in some embodiments, the distribution functions 265, 280 may be used to maintain ordered data sets, where the sets are defined by the device aggregation stride length specified by the distribution function. Beneficially, the ability to specify the stride length for device aggregation may enable lower-latency Storage Class Memory used for load-store functionality and/or cache coherency functionality.

The system 500 is further described with respect to the following example parameters. Assume that memory address locations Y1, Y2, Y3, Y4, . . . , Yn+1 are all 64-byte (64B) aligned 64B addresses, and that the memory address locations Y1, Y2, Y3, Y4, . . . , Yn+1 are consecutive 64B addresses, i.e., Y2=Y1+64B, and so forth. Further, memory address location Y1 is also 128B aligned (such that Address Y3 is also 128B aligned). Assume further that the distribution function (e.g., distribution function 265 of FIG. 2) is 128B. The hash mask (e.g., hash mask 610 of FIG. 6) is set such that the Hash Mask[7]=1 and all other Hash Mask bits=0.

For an input address (e.g., input address 605 of FIG. 6) of Y1, Y2, Y3, Y4, . . . , Yn+1, the mask result (e.g., mask result 615 of FIG. 6) and aggregated port selection value (e.g., aggregated port selection value 620 of FIG. 6) are [NAP:0] are zero for (Y1, Y2), (Y5, Y6) and one for (Y3, Y4), (Y7, Y8).

The memory address locations Y1, Y2, Y3, Y4, Yn all have memory destinations that are either serviced by Slave Agents (SAs) (e.g., slave agents 525-1 or 525-2), which are on IC2 520-1 or IC3 520-2 respectively. Furthermore, the memory is striped in 128B increments across SAs 525-1, 525-2. Thus, SA 525-1 is the memory destination for: (Y1, Y2), (Y5, Y6), and SA 525-2 is the memory destination for: (Y3, Y4), (Y7, Y8).

In some embodiments, the algorithm for host agent HA7 in servicing memory requests Y1, Y2, Y3, Y4, Yn, and the determination whether to route a Yn request either to SA 525-1 or 525-2, is the same as the algorithm described above, except that the host's H-SAM Table is referenced instead of the R-SAM Table.

The SAs 525-1, 525-2 have knowledge of the distribution function 265 and access to the H-SAM Table which contains the port aggregation NAP field. Thus, the SAs 525-1, 525-2 have knowledge of the access stride. Chained requests allow for efficient packet headers by not repeating subsequent addresses (e.g. repeating 8 byte/64-bit addresses) and instead packets have indicators that subsequent requests are in fixed size increments, e.g., memory address location Y2 is Y1+40. For the case of aggregated devices, as well as aggregated ports in the case of same-device port aggregation, embodiments of this disclosure describe chained for both fixed size increments, as well as distribution function stride sized increments: a. Thus, for the example of FIG. 5, the host agent HA7 can send chained requests to SA 525-1 for (Y1, Y2), (Y5, Y6), (Y9, Y10).

Chained requests may occur for subsequent requests with both 64B increments as well as 128B increments, where 128B increment is the distribution function stride. The benefit becomes more apparent for HA to SA-chained accesses where the SA has Storage Class Memory (SCM) and the distribution function stride accommodates large data sets such that HAs issue chained requests to device aggregated SAs with 4K or 1 MB distribution function stride sized increments, which is much larger than the 64B incremental stride, or 128B device aggregation stride. Further, the techniques may be equally applicable to HA to RA snoop chaining and RA to HA request chaining.

Figure 6:
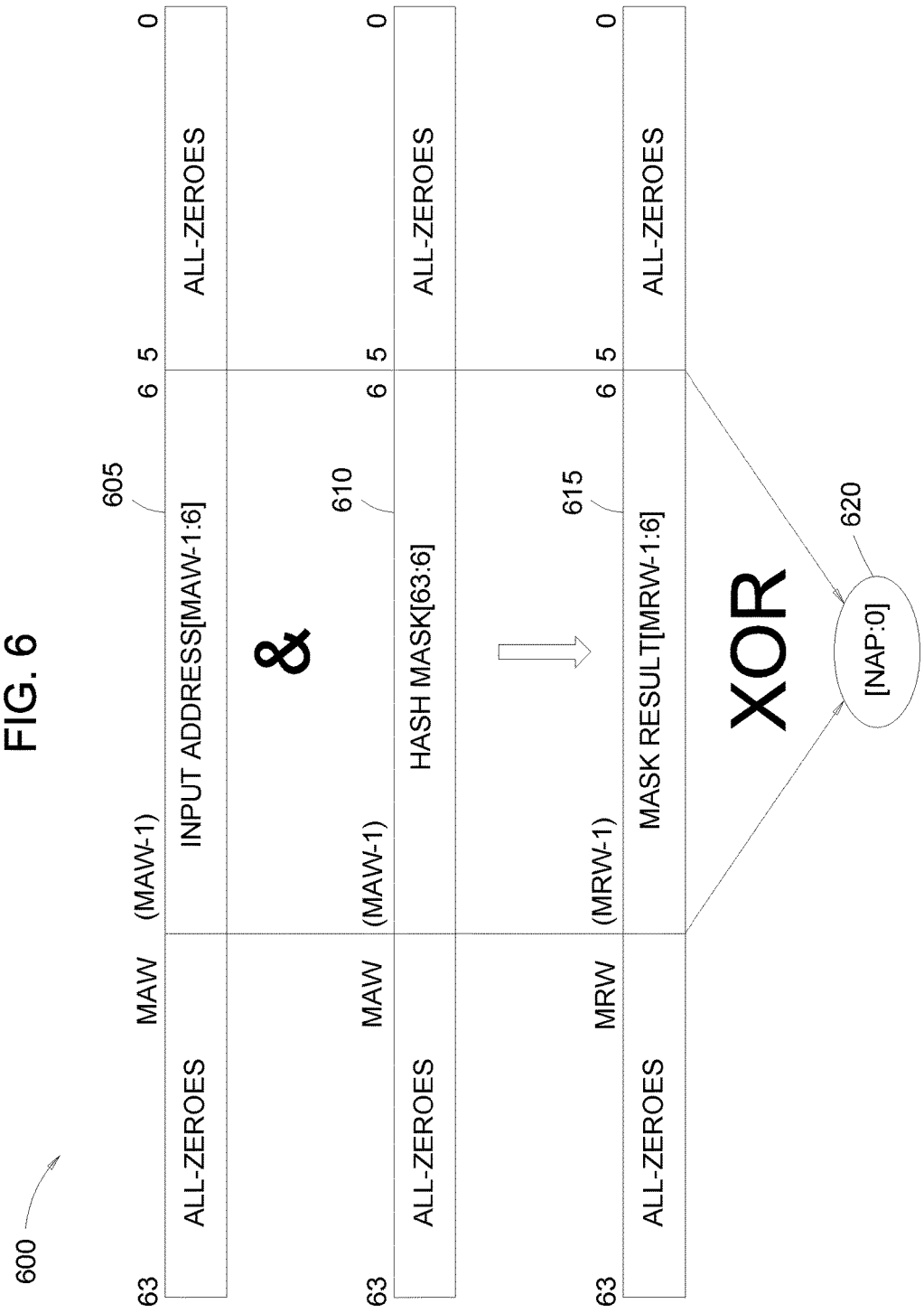
FIG. 6 is a diagram illustrating a distribution function, according to an example.

FIG. 6 is a diagram illustrating a distribution function 600, according to an example. The distribution function 600 may be used in conjunction with other features discussed herein, such as in the systems 200, 300, 400, and 500. Generally, the distribution function 600 provides ordering to data of a particular granularity, for example cache line-sized data, communicated using aggregated physical ports. The ordering provided to the data may enable at least one of a load/store memory access functionality and a cache coherence functionality between different ICs.

In some embodiments, the distribution function 600 comprises a hash mask 610 applied to an input address 605. The hash mask 610 may provide any desired distribution of traffic, so long as traffic destined for the same address is consistently routed onto the same physical port to achieve functional correctness. In one example, the hash mask 610 distributes traffic substantially evenly across the aggregated physical ports.

The input address 605 and the hash mask 610 may each have a predefined length. As shown, the input address 605 and the hash mask 610 each have a 64-bit length, although other lengths are possible. In some embodiments, a maximum address width (MAW) is less than the length of the input address 605. Based on the length of the MAW, the input address 605 and/or the hash mask 610 may have one or more leading zeros or trailing zeros.

The input address 605 is combined with the hash mask 610 using a bitwise logical AND operation, and produces a mask result 615. The mask result 615 is input to a predefined hash function (e.g. using logical XOR operations) and produces a aggregated port selection value 620 within the range of [NAP:0].

In one non-limiting example, assume that M is an integer multiple selected to achieve a maximum result width (MRW) of the mask result 615 that is greater than or equal to the MAW. Continuing the example, for $2^n$ aggregated ports, the predefined hash function may be described according to:

Port[(n−1):0]=Mask_Result[6+M*(n−1):6+(M−1)*n] . . . ^ Mask_Result[6+2n−1:6+n]^ Mask_Result[6+(n−1):6], where ^ represents a bitwise logical XOR operation. Other numbers of aggregated ports (including non-powers of 2) and suitable hash functions are also contemplated.

Figure 8:
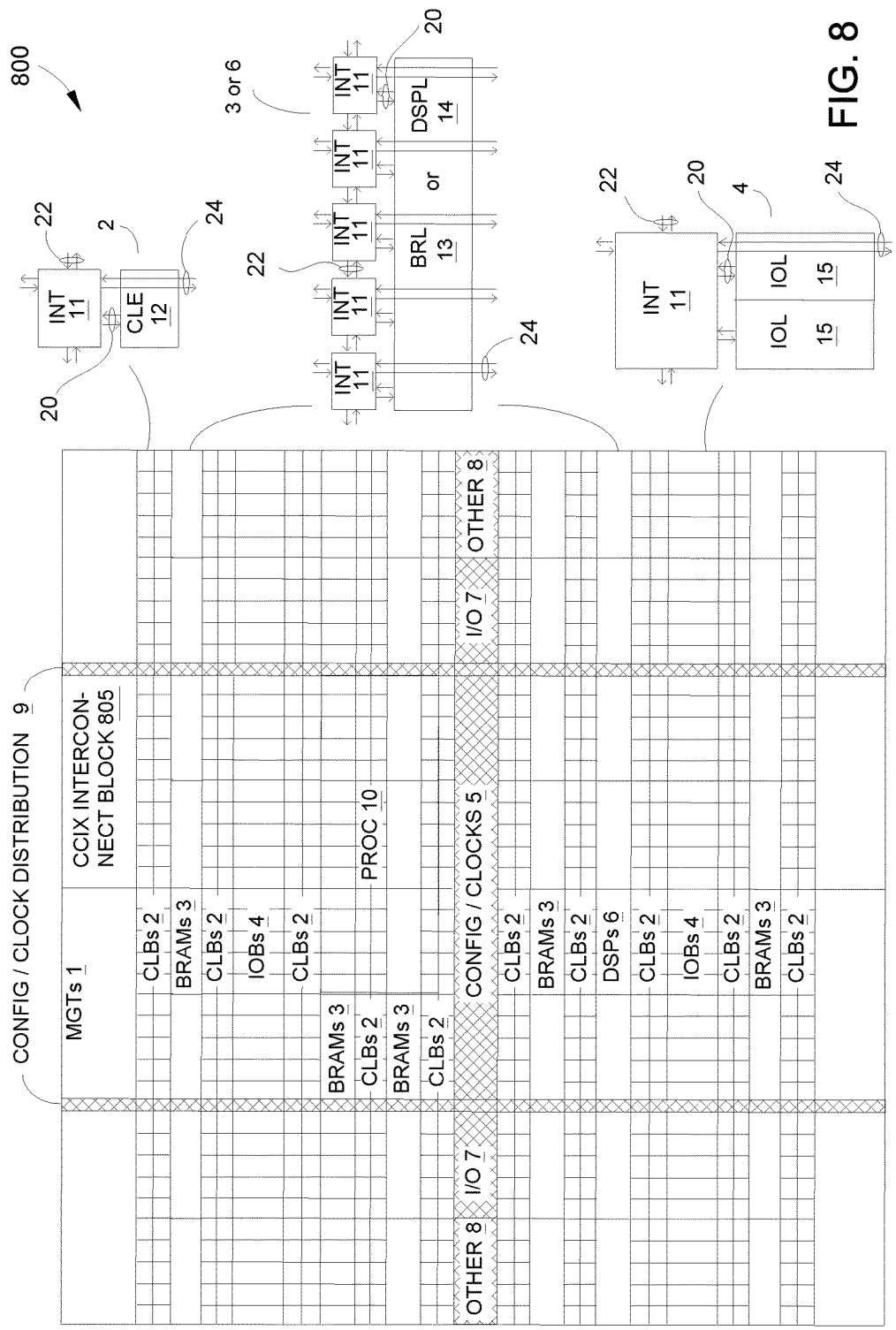
FIG. 8 illustrates an architecture of a field-programmable gate array (FPGA), according to an example.

In some embodiments, the various functionality described above (e.g., systems 200, 300, 400, 500) may be implemented as a CCIX interconnect block 805 included within an integrated circuit, such as a field programmable gate array (FPGA) or like type programmable circuit. FIG. 8 illustrates an architecture of FPGA 800 that includes a large number of different programmable tiles including multi-gigabit transceivers ("MGTs") 1, configurable logic blocks ("CLBs") 2, random access memory blocks ("BRAMs") 3, input/output blocks ("IOBs") 4, configuration and clocking logic ("CONFIG/CLOCKS") 5, digital signal processing blocks ("DSPs") 6, specialized input/output blocks ("I/O") 7 (e.g., configuration ports and clock ports), and other programmable logic 8 such as digital clock managers, analog-to-digital converters, system monitoring logic, and so forth. Some FPGAs also include dedicated processor blocks ("PROC") 10. FPGA 800 can include one or more instances of SerDes 122 described above.

In some FPGAs, each programmable tile can include at least one programmable interconnect element ("INT") 11 having connections to input and output terminals 20 of a programmable logic element within the same tile, as shown by examples included at the top of FIG. 1. Each programmable interconnect element 11 can also include connections to interconnect segments 22 of adjacent programmable interconnect element(s) in the same tile or other tile(s). Each programmable interconnect element 11 can also include connections to interconnect segments 24 of general routing resources between logic blocks (not shown). The general routing resources can include routing channels between logic blocks (not shown) comprising tracks of interconnect segments (e.g., interconnect segments 24) and switch blocks (not shown) for connecting interconnect segments. The interconnect segments of the general routing resources (e.g., interconnect segments 24) can span one or more logic blocks. The programmable interconnect elements 11 taken together with the general routing resources implement a programmable interconnect structure ("programmable interconnect") for the illustrated FPGA.

In an example implementation, a CLB 2 can include a configurable logic element ("CLE") 12 that can be programmed to implement user logic plus a single programmable interconnect element ("INT") 11. A BRAM 3 can include a BRAM logic element ("BRL") 13 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 6 can include a DSP logic element ("DSPL") 14 in addition to an appropriate number of programmable interconnect elements. An IOB 4 can include, for example, two instances of an input/output logic element ("IOL") 15 in addition to one instance of the programmable interconnect element 11. As will be clear to those of skill in the art, the actual I/O pads connected, for example, to the I/O logic element 15 typically are not confined to the area of the input/output logic element 15.

In the pictured example, a horizontal area near the center of the die (shown in FIG. 8) is used for configuration, clock, and other control logic. Vertical columns 9 extending from this horizontal area or column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, processor block 10 spans several columns of CLBs and BRAMs. The processor block 10 can various components ranging from a single microprocessor to a complete programmable processing system of microprocessor(s), memory controllers, peripherals, and the like.

Note that FIG. 8 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 8 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Thus, unlike other port aggregation schemes that are purely about unidirectional distribution of traffic over multiple transport connections, such as Ethernet port aggregation, embodiments of the disclosure offer improvements in two aspects. First, "conventional" port aggregation techniques provide a unidirectional distribution, while embodiments provide a bidirectional request/response distribution. For example, communication by two devices over aggregated ports using conventional port aggregation techniques may be source/destination based, i.e., the source distributes unidirectional traffic to the destination. According to embodiments of the disclosure, the port aggregation algorithm may require that the agent-pairs maintain the same distribution function for the response as the distribution function for the request. In one example, HA-to-RA responses must follow the same port-aggregated pathways as the original RA-to-HA request. In another example, RA-to-HA snoop responses must follow the same port-aggregated pathways as the original HA-to-RA snoop request.

Next, conventional port aggregation techniques may provide unordered requests between agent-pairs over aggregated ports, while embodiments ensure agent-pair coherent traffic to a same address is ordered on the same aggregated port. For example, requests between two devices over aggregated ports that are transported in opposite directions are unordered with respect to each other. According to embodiments of the disclosure, the algorithm is such that RA-to-HA requests to a particular address maintain the same distribution function as the HA-to-RA snoop to that same address. Thus, requests between two devices over aggregated ports that are transported in opposite directions are ordered with respect to each other, which enables cache-coherency enforcement for cases where same-address-hazard detection for requests/snoops being transported in opposite directions is required.

Thus, embodiments described herein are directed to systems capable of ensuring correct ordering of data communicated across multiple physical ports, in which data communicated according to a transport protocol is unordered relative to different physical ports. In some embodiments, the systems are configured to achieve one or more common functions over multiple physical ports between devices. For example, in some embodiments, a load/store memory access functionality and/or a cache coherence functionality may be achieved over multiple physical ports between the devices.

Further, concurrent functions may be applied between the devices with varying levels of port aggregation. Still further, a distribution function may be used to distribute traffic across aggregated physical ports evenly and in a functionally correct manner, regardless of the traffic servicing a load/store memory access functionality or a cache coherence functionality.

In one embodiment, a system is operable according to a predefined transport protocol. The system comprises a first integrated circuit (IC) comprising a memory controller communicatively coupled with a plurality of first physical ports, wherein data communicated according to the transport protocol is unordered relative to different first physical ports. The system further comprises a plurality of second physical ports that are communicatively coupled with one or more ports of the first physical ports via a plurality of physical links, wherein the plurality of second physical ports are distributed between at least a second IC and a third IC. The system further comprises one or more memory devices that are communicatively coupled with the second physical ports and accessible by the memory controller via the physical links. The first IC further comprises an identification map table describing a first level of port aggregation to be applied across the one or more ports of the first physical ports. Data communicated with the second IC and the third IC using the second physical ports is ordered according to a first distribution function.

In one embodiment, the system further comprises a switching device communicatively coupled with the plurality of second physical ports via the plurality of physical links; and with the one or more ports of the first physical ports via one or more second physical links.

In one embodiment, the system further comprises at least a fourth IC comprising one or more third physical ports that are communicatively coupled with one or more other ports of the first physical ports via a plurality of second physical links. The fourth IC further comprises a second distribution function that is different than the first distribution function. The identification map table further describes a second level of port aggregation to be applied across the one or more ports of the first physical ports.

In one embodiment, the first distribution function specifies a predefined first data granularity level, and the second distribution function specifies a predefined second data granularity level that is different than the first data granularity level.

In one embodiment, the first distribution function specifies a predefined first data granularity level, and the first IC further comprises a second distribution function that specifies the first data granularity level.

In one embodiment, the ordering provided to the data using the first distribution function enables at least one of: a load/store memory access functionality and a cache coherence functionality between the first IC, the second IC, and the third IC.

In one embodiment, the first distribution function specifies non-linear stride address increments for the aggregated first physical ports, and the addresses for the aggregated first physical ports are chained.

While the foregoing is directed to specific examples, other and further examples may be devised without departing from the basic scope thereof, and the scope thereof is determined by the claims that follow.

What is claimed is:

1. An integrated circuit (IC) operable according to a predefined transport protocol, the IC comprising:

a memory controller;
a plurality of first physical ports communicatively coupled with the memory controller, wherein data communicated according to the transport protocol is unordered relative to different first physical ports; and
an identification map table describing a first level of port aggregation to be applied across a first set of the first physical ports,
wherein the first set is configured to couple, via a plurality of first physical links, with a plurality of second physical ports,
wherein one or more memory devices are communicatively coupled with the second physical ports and are accessible by the memory controller via the first physical links, and
wherein the memory controller is configured to:
 communicate, via the first physical links, the first level of port aggregation; and
 receive, via the first physical links, ordered data that is based on the first level of port aggregation.

2. The IC of claim 1, wherein the memory controller comprises programmable circuitry.

3. The IC of claim 1, wherein the one or more memory devices comprises a first memory device that is communicatively coupled with at least two of the second physical ports.

4. The IC of claim 1, wherein the plurality of second physical ports correspond to a second IC,
wherein the second IC comprises a first distribution function configured to provide ordering to data communicated using the second physical ports,
wherein the first distribution function is based on the first level of port aggregation,
wherein a second set of the first physical ports are coupled, via a plurality of second physical links, with a plurality of third physical ports of a third IC,
wherein the third IC comprises a second distribution function that is different than the first distribution function, and
wherein the identification map table further describes a second level of port aggregation to be applied across the second set of the first physical ports.

5. The IC of claim 4, wherein the first distribution function specifies a predefined first data granularity level, and
wherein the second distribution function specifies a predefined second data granularity level that is different than the first data granularity level.

6. The IC of claim 4, wherein the first distribution function specifies non-linear stride address increments for the aggregated second physical ports, and
wherein the addresses for the aggregated second physical ports are chained.

7. The IC of claim 1, wherein receiving the ordered data enables at least one of: a load/store memory access functionality and a cache coherence functionality between the first IC and a second IC.

8. The IC of claim 1, wherein the plurality of first physical links are coupled with an intermediate switching device, and
wherein the intermediate switching device is coupled with the first set of the first physical ports via a plurality of second physical links.

9. A system operable according to a predefined transport protocol, the system comprising:
a first integrated circuit (IC) comprising a memory controller communicatively coupled with a plurality of first physical ports, wherein data communicated according to the transport protocol is unordered relative to different first physical ports;

a second IC comprising a plurality of second physical ports that are communicatively coupled with a first set of the first physical ports via a plurality of first physical links; and one or more memory devices that are communicatively coupled with the second physical ports and accessible by the memory controller via the first physical links, wherein the first IC further comprises an identification map table describing a first level of port aggregation to be applied across the first set of the first physical ports, and wherein the second IC comprises a first distribution function configured to provide ordering to data communicated using the second physical ports, wherein the first distribution function is based on the first level of port aggregation.

10. The system of claim 9, wherein the one or more memory devices comprises a first memory device that is communicatively coupled with at least two of the second physical ports.

11. The system of claim 9, further comprising:
a third IC comprising:
    a plurality of third physical ports that are communicatively coupled with a second set of the first physical ports via a plurality of second physical links; and
    a second distribution function that is different than the first distribution function,
wherein the identification map table further describes a second level of port aggregation to be applied across the second set of the first physical ports.

12. The system of claim 11, wherein the first distribution function specifies a predefined first data granularity level, and
    wherein the second distribution function specifies a predefined second data granularity level that is different than the first data granularity level.

13. The system of claim 9, wherein the first distribution function specifies a predefined first data granularity level, and
    wherein the first IC further comprises a second distribution function that specifies the first data granularity level.

14. The system of claim 9, wherein the ordering provided to the data using the first distribution function enables at least one of: a load/store memory access functionality and a cache coherence functionality between the first IC and the second IC.

15. The system of claim 9, further comprising:
a switching device communicatively coupled with:
    the plurality of second physical ports via the plurality of first physical links, and
    the first set of the first physical ports via a plurality of second physical links.

16. A system operable according to a predefined transport protocol, the system comprising:
    a first integrated circuit (IC) comprising a memory controller communicatively coupled with a plurality of first physical ports, wherein data communicated according to the transport protocol is unordered relative to different first physical ports;
    at least a second IC comprising a plurality of second physical ports that are communicatively coupled with a first set of the first physical ports via a plurality of first physical links;
    at least a third IC comprising a plurality of third physical ports that are communicatively coupled with a second set of the first physical ports via a plurality of second physical links;
    a plurality of memory devices that are communicatively coupled with the second physical ports or the third physical ports, wherein the plurality of memory devices are accessible by the memory controller via the first physical links or the second physical links,
    wherein the first IC further comprises an identification map table describing:
        a first level of port aggregation to be applied across the first set of the first physical ports; and
        a second level of port aggregation to be applied across the second set of the first physical ports,
    wherein the second IC further comprises a first distribution function configured to provide ordering to data communicated using the second physical ports, wherein the first distribution function is based on the first level of port aggregation, and
    wherein the third IC further comprises a second distribution function configured to provide ordering to data communicated using the third physical ports, wherein the second distribution function is based on the second level of port aggregation.

17. The system of claim 16, wherein the first distribution function is different than the second distribution function.

18. The system of claim 17, wherein the first level of port aggregation is different than the second level of port aggregation.

19. The system of claim 17, wherein the first distribution function specifies a predefined first data granularity level, and
    wherein the second distribution function specifies a second data granularity level that is different than the first data granularity level.

20. The system of claim 16, wherein the first distribution function specifies a predefined first data granularity level, and
    wherein the first IC further comprises a third distribution function that specifies the first data granularity level.

* * * * *